United States Patent

[11] 3,540,737

[72] Inventor Theodore H. Borthwick
2741 Pilgrim Court, Winston-Salem, North Carolina 27106

[21] Appl. No. 791,956
[22] Filed Jan. 17, 1969
[45] Patented Nov. 17, 1970

[54] ADAPTOR DISC FOR PREVENTING SLIPPAGE BETWEEN RECORDS
7 Claims, 7 Drawing Figs.

[52] U.S. Cl. 274/1, 274/42
[51] Int. Cl. G11b
[50] Field of Search 274/42, 15,(Consulted), 1, 39(Consulted)

[56] References Cited

UNITED STATES PATENTS

| | | | |
|---|---|---|---|
| 2,559,786 | 7/1951 | Mueller | 274/42 |
| 2,734,748 | 2/1956 | Parvin | 274/42 |
| 2,906,536 | 9/1959 | Mauerhoff | 274/42 |
| 3,051,496 | 8/1962 | Borgia | 274/42 |
| 3,201,133 | 8/1965 | Matsukata | 274/42 |

FOREIGN PATENTS

| | | | |
|---|---|---|---|
| 961,952 | 1964 | Great Britain | 274/42 |

*Primary Examiner*—Leonard Forman
*Assistant Examiner*—Dennis A. Dearing
*Attorney*—Parrott, Bell, Seltzer, Park and Gibson ABSTRACT: An adaptor disc for preventing slippage between records when stacked upon a rotating turntable of a record player and adapted to be mounted in overlying relation to the label area of various size phonograph records having centrally disposed therein a variety of size spindle receiving apertures. The adaptor disc comprises a transparent circular disc having a spindle receiving aperture centrally disposed therein, means forming a removable annular portion concentrically disposed therein adjacent said aperture, and one face of said disc having formed thereon a plurality of radially extending circularly arranged ridges of substantially uniform height.

THEODORE H. BORTHWICK,
INVENTOR,

BY Parrott, Bell, Seltzer, Park & Gibson
ATTORNEYS

ADAPTOR DISC FOR PREVENTING SLIPPAGE BETWEEN RECORDS

This invention relates to an adaptor disc for preventing slippage between records when stacked upon a rotating turntable of a record player and which is adapted to be mounted in overlying relation to the label area of phonograph records.

While such prior art adaptor discs are known, these discs have only been adapted to be mounted on a particular size record having a particular size spindle receiving aperture centrally disposed therein.

With the foregoing in mind, it is an object of this invention to provide an improved adaptor disc which is adapted to be mounted in overlying relation to the label area of various size phonograph records having centrally disposed therein a variety of size spindle receiving apertures.

The above and more desirable objects inherent in and encompassed by the invention together with other advantages will be more fully comprehended upon reading the ensuing description with reference to the accompanying drawing, wherein.

Referring more specifically to the drawings wherein like numerals are used to indicate like parts where possible, there are illustrated in FIGS. 2—5 various embodiments of the adaptor disc of this invention. Generally indicated the adaptor disc comprises a transparent circular disc having a spindle receiving aperture centrally disposed therein, means forming a removable annular portion concentrically disposed therein adjacent said aperture, one face of said disc being adapted for concentric mounting in overlying relation to the label area of a phonograph record and the other face having formed thereon a plurality of radially extending circularly arranged ridges of substantially uniform height.

Figure 2:
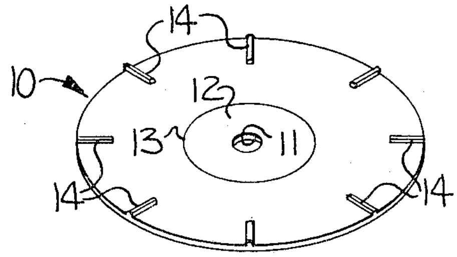
FIG. 2 is a perspective view of an adaptor disc of this invention.

The embodiment shown in FIG. 2 is preferred and comprises a thin transparent circular disc 10 having a spindle receiving aperture 11 centrally disposed therein corresponding to the aperture of 78 r.p.m. and 33⅓ r.p.m. records and a removable inner annular portion 12 concentrically disposed therein and defining said aperture, the outer diameter of which is formed by a circular score line 13 that penetrates substantially through disc 10. Score line 13 has a diameter corresponding to the aperture of 45 r.p.m. records, so that upon removal of the inner annular portion the thus enlarged aperture of the disc corresponds to the apertures of 45 r.p.m. records.

The upper face of the adaptor disc has formed hereon a plurality of radially extending equally spaced apart ridges 14 of substantially uniform height and which are of relatively short length and extend from the periphery of the disc 10 inwardly over a portion only of the radius of the upper face.

Figure 3:
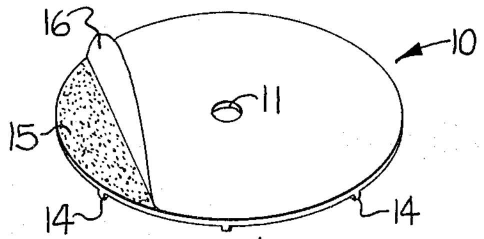
FIG. 3 is a perspective view of the adaptor disc of FIG. 1 looking at the opposite face and showing an adhesive material and protective cover which facilitates mounting the disc on a phonograph record.

The ridges 14 are of predetermined circumferential width, substantially uniform throughout the length of the ridges, and are located on the disc at positions circumferentially spaced apart by distances many times greater than the circumferential width of the ridges. In the illustrated embodiment, eight ridges are provided. In FIG. 3 there is illustrated the lower face of an adaptor disc of this invention, the lower face being adapted for mounting on a phonograph record in overlying relation to the label area thereof. The lower face of the circular disc 10 is provided with a suitable adhesive material 15, preferably transparent. The adhesive material 15 is protected from drying up and losing its adhesive property from exposure to air and to allow storage of the device without the adhesive material securing to undesirable objects by a removable protective cover 16 which is adhesively attached to the adhesive material 15.

Figure 4:
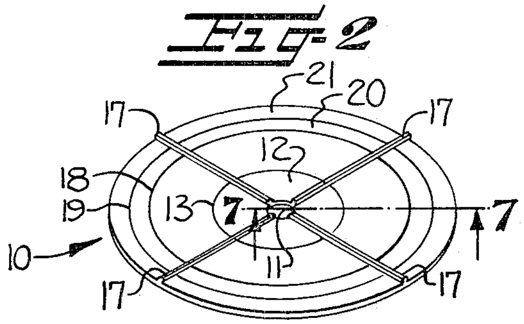
FIG. 4 is a perspective view of another embodiment of an adaptor disc of this invention.
Figure 5:
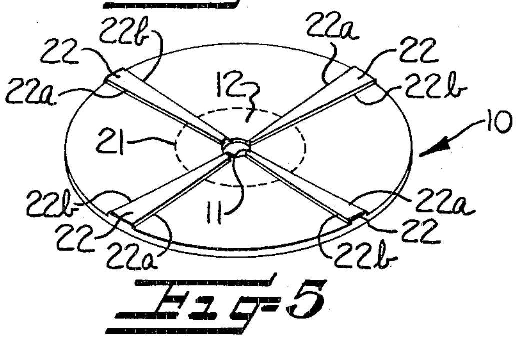
FIG. 5 is a perspective view of still another embodiment of an adaptor disc of this invention.
Figure 7:
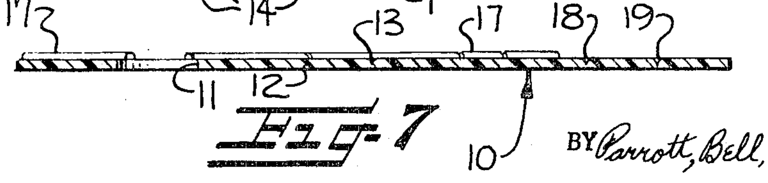
FIG. 7 is a sectional view taken substantially along lines 7–7 of FIG. 4.

As alternatives, other embodiments of the adaptor disc are illustrated in FIGS. 4 and 5. The embodiment illustrated in FIG. 4 is quite similar to that already described and differs only in two respects. The differences reside in the plurality of radially extending ridges 17 which are four in number and extend along the entire radius of the disc 10 rather than extending from the periphery of the disc 10 over a portion only of the radius thereof and the additional circular score lines 18 and 19 which penetrate substantially through the disc 10, FIG. 7, to define outer annular portions 20, 21, respectively. It is to be noted that the ridges 17 are at locations circumferentially spaced apart by distances many times greater than the circumferential width thereof. As is well known various size records have the annular groove area beginning at various distances from the center of the record. By providing these removable outer annular portions, the diameter of the disc can readily be changed to obtain a disc having a diameter no greater than the inner diameter of the annular groove area of the phonograph record with which the disc is to be used, to thus avoid any interference with the playing of the record.

In FIG. 5 an adaptor disc contemplated by this invention is illustrated wherein rather than having a circular score line 12 as illustrated in FIGS. 2 and 4 for forming the removable annular portion 12 of the disc, a circular perforated line 23 is provided as an alternative. In addition FIG. 5 illustrates another form of the radially extending ridges. Therein radially extending ridges 22 are illustrated wherein the side edge portions **22*a* and 22*b* of the ridges 22 converge toward the aperture 11 and extend along the radius of the disc 10. The advantages of these shaped ridges 22 will be set forth in describing the use of the disc. It will be noted that the ridges 22** are located at positions circumferentially spaced apart by distances many times greater than the circumferential width thereof.

The manner of use of the adaptor disc of this invention is quite simple. When ready to be applied to a phonograph record, a disc is chosen having a diameter no greater than the inner diameter of the annular groove area of the phonograph record with which the disc is to be used. The protective cover 16 is removed from the disc 10 and the disc 10 mounted concentric with the record in overlying relation to the label area such that the adhesive material 15 is caused to adhere to the label area of the record. If the phonograph record is of the 45 r.p.m. type, then annular portion 12 is removed by pushing the annular portion 12 out through the spindle receiving aperture of the record. A similar disc 10 is mounted on the opposite face of the record. The spindle receiving aperture of disc 10 will then reinforce the spindle receiving aperture of the record. Also, if the spindle receiving aperture of the record is worn, the spindle receiving aperture of the disc will serve to center the phonograph record about the spindle to be received therein.

Figure 1:
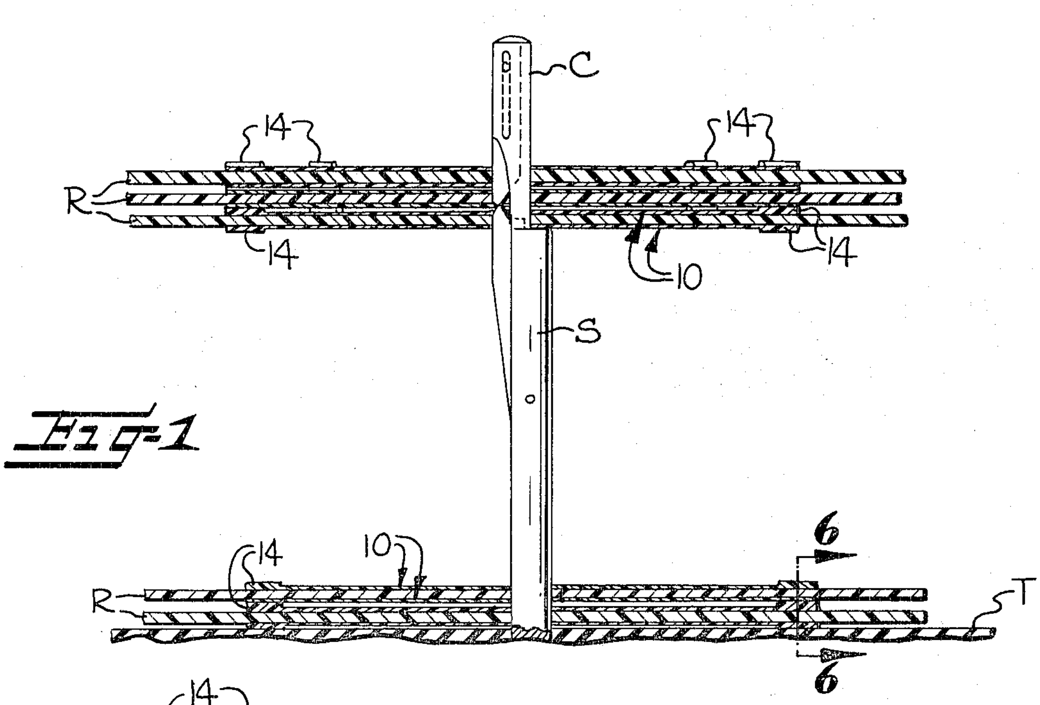
FIG. 1 is a side elevation, parts in section, showing a record player in operation with phonograph records having the adaptor disc of this invention mounted thereon.
Figure 6:
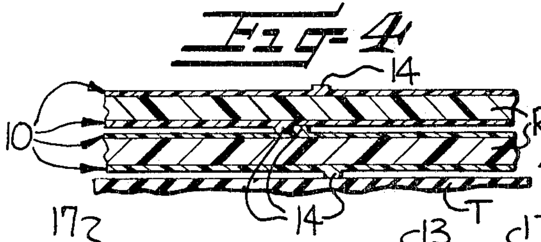
FIG. 6 is a sectional view taken substantially along line 6–6 of FIG. 1 showing in section the interlocking of opposing adaptor disc of this invention.

When phonograph records have the adaptor disc of this invention mounted on both faces thereof as discussed earlier and as illustrated in FIG. 1, several records R may be stacked on a turntable T or changer C with the spindle S disposed through the spindle receiving apertures of the records without slippage between the records R during rotation of the turntable T. The present invention is especially adapted for use with a conventional automatic record changer as shown in FIG. 1 of the drawings wherein the records are initially stacked about the portion C with the apertures thereof eccentric to the spindle S. When the changer mechanism operates, the lowermost record is shifted laterally with respect to the record thereabove so that the spindle receiving aperture in the lowermost record is aligned with spindle S whereupon such lowermost record drops downwardly onto turntable T or other records which have previously been placed upon the turntable. The spacing of the ridges formed on the face of the adaptor disc is such that ridges are disposed at locations circumferentially spaced apart by distances many times greater than the circumferential width of the ridge whereby a record having an adaptor disc thereon is adapted to be laterally shifted by the associated automatic record changer mechanism with respect to a record immediately thereabove so as to be properly aligned with the spindle S to drop into operative plane position. The records R are prevented from slipping relative to each other by the abutting engagement or interlocking of the radially extending ridges on opposing discs as illustrated in FIGS. 1 and 6. Where the ridges have side edges which extend along the radius of the disc 10, as in FIG. 5, the side edges of opposing ridges will abut throughout their entire length for obtaining better interlocking engagement.

In the drawing and specification, there has been set forth several embodiments of the invention, and although specific terms are employed, they are used in a generic and descriptive sense only and not for purposes of limitation.

I claim:

1. An adaptor disc for preventing slippage between records when stacked upon a rotating turntable of a record player and adapted to be mounted in overlying relation to the label area of various size phonograph records having centrally disposed therein a variety of size spindle receiving apertures, said adaptor disc comprising a transparent circular disc having a spindle receiving aperture centrally disposed therein, means forming a removable inner annular portion concentrically disposed in the disc and defining said aperture, a plurality of radially extending ridges of substantially uniform height and predetermined circumferential width formed on one face of said disc at locations circumferentially spaced apart by distances many times greater than said circumferential width so that in a stack of records disposed on an automatic record changer with each of said records having said adaptor disc disposed at opposite sides thereof, the lowermost record is adapted to be shifted laterally by the automatic record changer mechanism with respect to the record immediately thereabove, and a layer of transparent adhesive material disposed on the other face of said disc to facilitate mounting of said disc in overlying relation to the label area of a phonograph record.

2. The adaptor disc of claim 1 wherein said ridges are of relatively short length and extend from the periphery of the disc inwardly over a portion only of the radius of said face.

3. The adaptor disc of claim 1 wherein said ridges are equally spaced apart and wherein each ridge has side edge portions convergingly arranged relative to said aperture with each of said side edges extending along the radius of said disc.

4. The adaptor disc of claim 1 including a removable protective cover adhesively attached to said adhesive material.

5. The adaptor disc of claim 1 wherein said means forming the removable inner annular portion comprises a circular score line concentrically disposed about said aperture.

6. The adaptor disc of claim 1 wherein said means forming the removable inner annular portion comprises a circular perforated line concentrically disposed about said aperture.

7. The adaptor disc of claim 1 wherein said disc includes means forming a removable outer annular portion concentrically disposed therein.